Oct. 7, 1930.  H. W. ROGERS  1,777,418
SYNCHRONIZED PHOTOGRAPHY AND SOUND
Filed Oct. 29, 1927   3 Sheets-Sheet 1
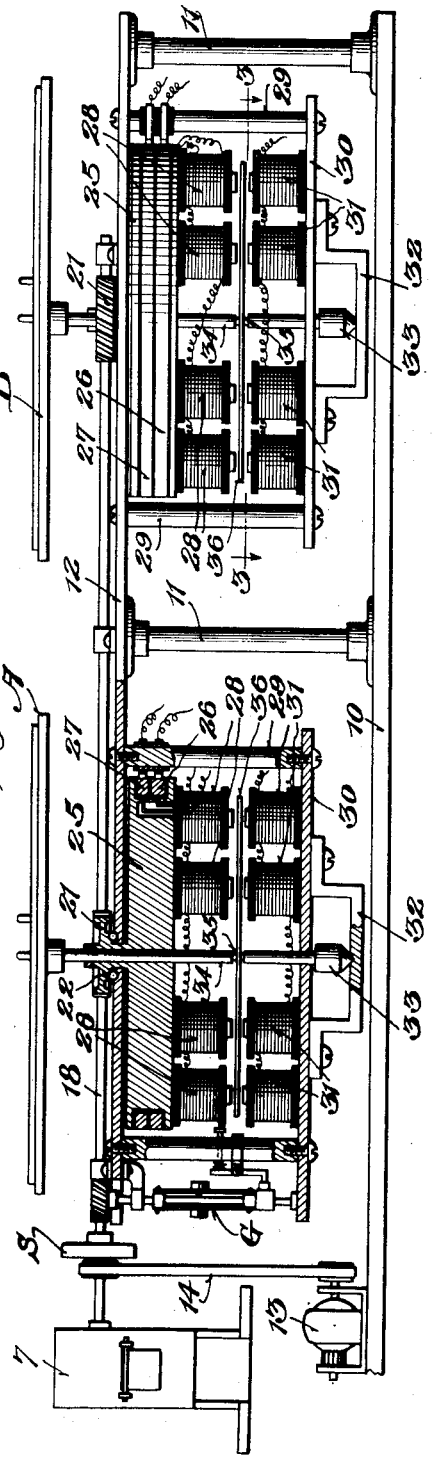
Inventor
H. W. Rogers,
By [signature]
Attorney Oct. 7, 1930.    H. W. ROGERS    1,777,418
SYNCHRONIZED PHOTOGRAPHY AND SOUND
Filed Oct. 29, 1927    3 Sheets-Sheet 2
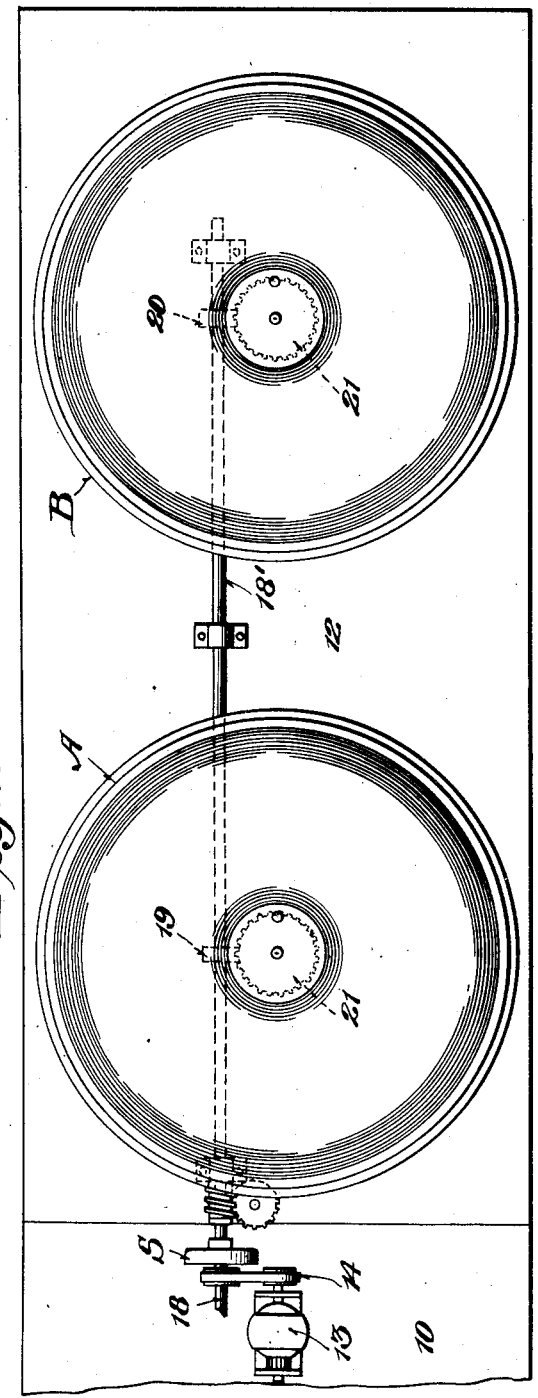
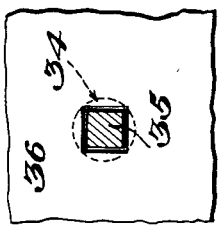
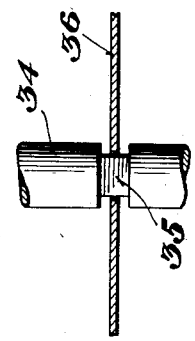
Inventor
H. W. Rogers,

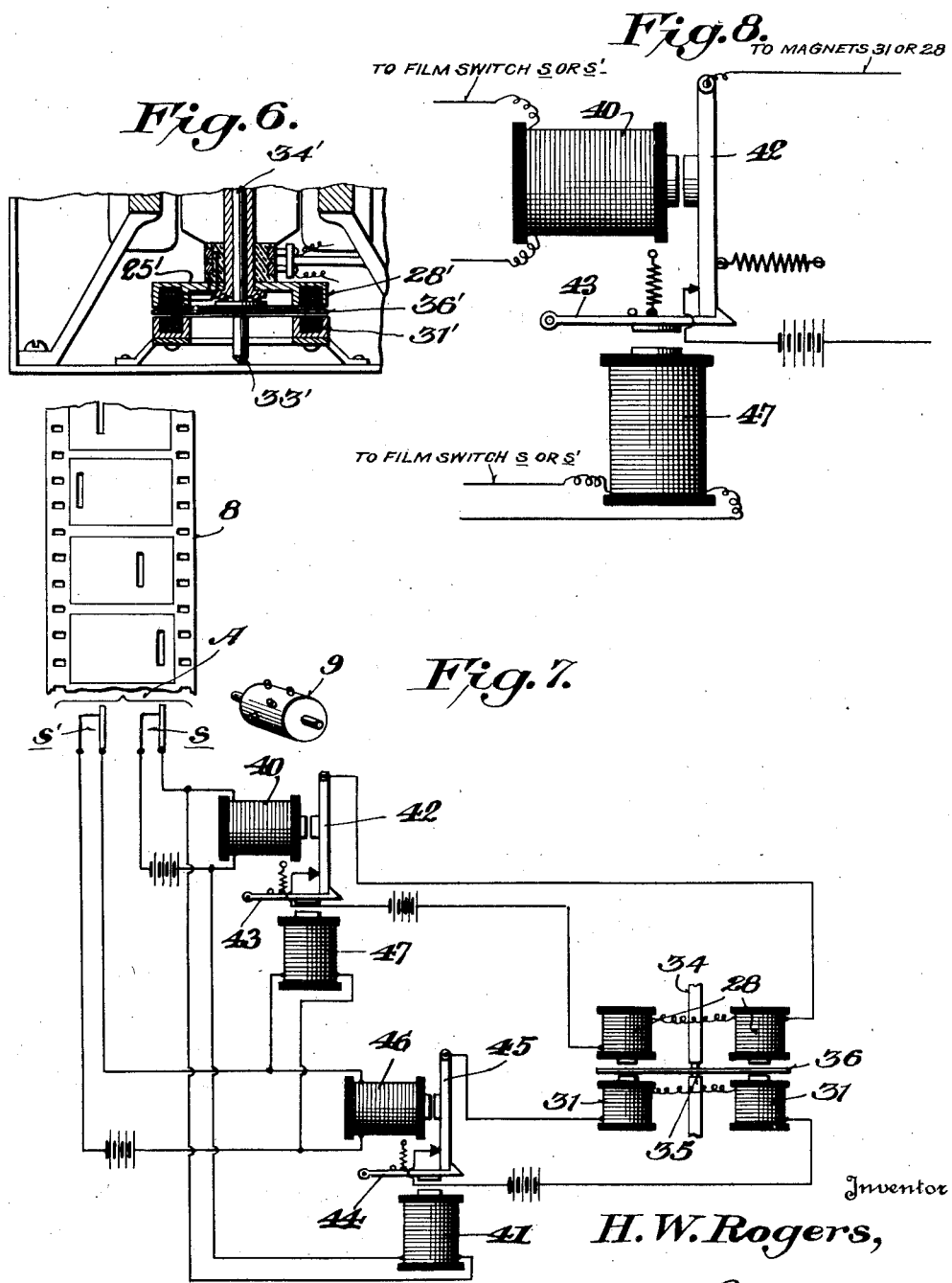

Patented Oct. 7, 1930

1,777,418

UNITED STATES PATENT OFFICE

HARRISON W. ROGERS, OF NEW YORK, N. Y.

SYNCHRONIZED PHOTOGRAPHY AND SOUND

Application filed October 29, 1927. Serial No. 229,598.

This invention relates to the art of synchronized photography and sound, that is more particularly to synchronized talking, singing, and musical motion pictures, and this particular arrangement is adapted for use either as a means of recording or reproducing as may be desired, one object of the invention being the provision of a combination of mechanisms whereby the film has cooperative means for selecting or electing at the proper time the operation of sound recording or reproducing means, and in such a manner that such latter means is started and stopped from the film at the proper time, and also whereby successive sound recording and reproducing turntables may be started and stopped, to produce a continuous sound recordation or reproduction, as may be desired.

Another object of this invention is the provision of a novel arrangement of motion picture photographing machine to have operated in synchrony therewith sound recording and/or reproducing machines, with a single motor for operating all, there being provided a film actuating selecting device whereby the sound recording and/or reproducing machine is started and stopped and a particular turntable thereof selected to give synchronous sound and motion pictures.

In the accompanying drawings:—

Figure 1 is a view partly in diagram and partly in elevation of the complete apparatus embodying my invention.

Figure 2 is a top plan view of the two turntables, showing in dotted lines the arrangement of the drive shaft.

Figure 3 is a section on line 3—3 of Figure 1.

Figures 4 and 5 are detail views of the flexible disk clutch and its adjacent attachment to the shaft.

Figure 6 is an enlarged sectional view of a modified form of clutch employing annular solenoids, in lieu of a plurality of electromagnets.

Figure 7 is a diagrammatic view of one electric circuit lay-out showing the method of controlling one turntable.

Figure 8 is an enlarged view of the locking and releasing magnets used in said circuit.

Referring to the drawings, the numeral 7 designates the moving picture machine, here shown as a projecting machine and not a camera, although it is to be understood that a camera can be used. This machine carries a film 8, and a film controlled switch operating member 9, there being two switches $s$ and $s'$, which constitute the "starting" and "stopping" switches of the machine. As will be understood, the film through this mechanism will at the proper time cause the selection of either one of the turntables or platforms A or B, which are mounted as will presently appear.

The base or support 10 has standards 11, which support a rectangular platform or shelf 12, and from or upon this is mounted the complete sound recording and/or reproducing mechanism.

A single electric motor 13 with control mechanism for regulating its speed, is connected through a belt 14 to the main shaft 18, of the projecting machine. A flexible spiral spring connector S, forms a compensating connection in the shaft 18, so that a compensating means is provided between the sections of said shaft, to take care of the initial inertia as will presently appear, there being further provided a ball governor brake mechanism G, which cooperates with the connector S, to filter out any inequalities from the machine 7 to the turntables. Mounted upon the shaft 18 are two worm gears 19 and 20, one to each turntable A or B, and as each mechanism operated thereby is identical the description of one will suffice for both.

The worm 19 engages a gear 21, antifrictionally supported as at 22, and attached to the weighted or balance wheel 25, which is supported below the platform 12, and is provided with the conductor rings 26 and 27, whereby current is fed to the respective electromagnets 28 carried by and suspending from the underside of the wheel 25. Supported from the platform 12, by means of the supports 29 is a plate 30, which in turn carries the electromagnets 31, while journaled in the bearing frame 32, is the lower end 33 of the turntable operating and carrying shaft 34, which permits the wheel 25 to rotate freely, except when it is desired that the turntable should be operated by the member 25. The shaft 34 is provided with a reduced shouldered portion 35, which is here shown square, but which may be of any desired irregular shape, to permit the flexible magnetic metallic disk clutch 36 to slide thereon, but at all times rotate with the shaft or hold the shaft against rotation. Thus when the electromagnets 31 are energized, the disk will flex toward and be engaged by them to lock the turntable A or B against rotation, the energization of the electromagnets 28, the electromagnets 31 being simultaneously de-energized, flexing the disk 36 into engagement with them, and thus connecting the shaft 34 and platform A or B, with the rotating wheel 25, and thus causing the turntable to be rotated from an inert or "stopped" position.

In making a clutch of this type, the film controlled switches s and s', are indirectly connected in circuit respectively with the electromagnets 31 and 28, respectively, so that when the switch s is closed the electromagnets 28 are energized and the turntable is rotated, but when the switch s' is energized, the electromagnets 28 are deenergized and the electromagnets 31 are energized and the turntable halted.

The selecting switch may be operated by either turntable at the end or near the end of the sound recording and/or reproducing, so that the circuits leading from the switches s and s' will be connected with the next turntable, thus providing a means for continuous automatic operation. It is also possible to have four switches as switches s and s', the film actuating means being located in positions as shown in Figure 1, so that the "starting" and "stopping" indications for turntable A, will be at one side of the "starting" and "stopping" indications for turntable B.

In the modification shown in Figure 6, the clutch disk 36', is identical with the disk 36, and is mounted upon the shaft 34', but instead of the wheel 25' carrying a plural number of electromagnets a single solenoid 28' is employed, while the "stopping" solenoid 31', is also single instead of the plural. Otherwise the construction is identical.

This form of clutch is exceedingly desirable in synchronized sound and photography, and particularly where it is desirable to record or reproduce motion pictures without sound at the beginning or interspersed throughout, for in this case the clutch must act quickly and without slip and with degrees that are so infinitesimal, that teeth could not be made fine enough to accomplish the best results, the action of this depending solely upon the rapidity with which the various connecting and disconnecting electromagnets are energized. It has also been found that with a clutch of this type there is no perceptible slip, and that its action of connection and release is exceedingly rapid.

The switch s—s' and the operating member 9, are merely diagrammatic of the switch as shown in Patent No. 1,254,436, dated January 22nd, 1918, and which is the mechanism here used to control the turntables. Thus when the member 9 momentarily operates the switch s, the circuit to the electromagnets 40 and 41 is closed, and the switch 42 is attracted and locked by the spring armature catch 43, and closes the circuit to energize and hold energized the electromagnets 28. At the same time, the electromagnet 41 attracts the spring armature 44 and releases the armature switch 45 to open the circuit to the electromagnets 31. By this arrangement, the selected turntable is connected to the revolving electromagnets 28 and rotated therewith. When the record has about completed its operation, the film switch s' is closed momentarily by the member 9, and the circuit including the electromagnets 46 and 47 is closed and these electromagnets are energized momentarily. The electromagnet 46 attracts the armature 45 and the lock 44 holds the circuit controlled thereby closed and energizes the electromagnets 31, which attract the flexible disk 36, which has been simultaneously released by the energization of the electromagnet 47, which attracted the armature lock 43 and by releasing the armature 42 caused the opening of the circuit to the electromagnets 28. By this means the turntable was brought to a halt.

I claim:—

1. The combination with a motion picture machine and a sound recording-reproducing machine having a turntable, of two sets of film controlled switches, one set for starting and the other for stopping said turntable, a starting and a stopping electrical device for said turntable controlled by said switches, and means controlled by each film controlled switch, whereby the closing of one switch energizes its electrical device and de-energizes the electrical device of the other switch.

2. The combination with a motion picture machine and a sound recording-reproducing machine having two turntables, of two pairs of film controlled switches, one pair to each turntable, a flexible magnetic member connected to each turntable, two electromagnets opposed to each other and in attractive relation to said magnetic member, one electromagnet being rotatable and energizable to attract and hold the magnetic member to cause the magnetic member and turntable to be rotated and the other electromagnet being stationary and energizable to attract and hold the magnetic member and turntable stationary, and means connected in circuit with said electromagnets and the switches, whereby the closing of one switch energizes one electromagnet and de-energizes the other electromagnet or vice versa.

3. The combination with a motion picture machine a sound recording-reproducing machine having two turntables, and an electric motor for driving the same, of two pairs of film controlled switches, a rotary and a stationary electromagnet to each turntable, the rotary ones being operably connected to the electric motor and being rotated when the motion picture machine is operated, a flexible magnetic metallic disk disposed between the electromagnets and connected to its turntable to control the movement of the same, a circuit including a source of electrical energy and its electromagnet and switch, and means connected in each circuit for the control of the other switch of the pair, whereby the closing of one switch and its electromagnet will de-energize the other electromagnet.

In testimony whereof I affix my signature.

HARRISON W. ROGERS.